(12) United States Patent
Kübler et al.

(10) Patent No.: US 7,614,702 B2
(45) Date of Patent: Nov. 10, 2009

(54) REAR SEAT SYSTEM OF A MOTOR VEHICLE

(75) Inventors: Markus-Claus Kübler, Schoemberg (DE); Klaus-Roger Düwel, Marbach (DE); Klaus Padberg, Stuttgart (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 11/827,614

(22) Filed: Jul. 12, 2007

(65) Prior Publication Data

US 2008/0012393 A1    Jan. 17, 2008

(30) Foreign Application Priority Data

Jul. 12, 2006    (DE) .................. 10 2006 032 133

(51) Int. Cl.
    *B60N 2/22* (2006.01)
(52) U.S. Cl. .................. 297/378.13; 297/378.1; 296/65.16
(58) Field of Classification Search ............ 297/378.13, 297/278.1, 378.1; 296/65.1, 65.01, 65.16
See application file for complete search history.

(56) References Cited

U.S. PATENT DOCUMENTS

| | | | |
|---|---|---|---|
| 4,475,763 A | 10/1984 | Hamatani et al. | |
| 4,708,385 A | 11/1987 | Kondo | |
| 4,721,338 A | 1/1988 | Kondo | |
| 4,880,264 A * | 11/1989 | Yamazaki et al. | 297/378.13 |
| 4,904,003 A * | 2/1990 | Yamazaki et al. | 297/378.13 |
| 5,297,839 A | 3/1994 | Fukushima | |
| 5,662,377 A | 9/1997 | Holdampf et al. | |
| 5,870,967 A | 2/1999 | Hecht | |
| 6,811,199 B2 * | 11/2004 | Nozaki | 297/378.13 |
| 7,168,763 B2 * | 1/2007 | Lee | 297/354.1 X |
| 7,338,128 B2 * | 3/2008 | Inoue et al. | 297/378.13 |
| 2006/0001307 A1 | 1/2006 | Embach | |
| 2006/0033372 A1 | 2/2006 | Lee | |

FOREIGN PATENT DOCUMENTS

| | | |
|---|---|---|
| DE | 10023779 A1 | 11/2001 |
| DE | 10 2005 001 396 A1 | 7/2006 |
| FR | 2794078 A1 | 12/2000 |
| FR | 2830802 A1 | 4/2003 |

OTHER PUBLICATIONS

European Search Report dated May 8, 2008.
European Search report dated Jul. 14, 2008.

* cited by examiner

*Primary Examiner*—Anthony D Barfield

(57) ABSTRACT

A rear seat system of a motor vehicle includes at least one seat that has a backrest and a seat surface. The backrest has, laterally, a backrest sidewall extending at least over part of the height of the backrest, and can be folded over forward about a pivot axis independently of the lateral backrest sidewall or cheek. It is important that the backrest sidewall is mounted such that it can be adjusted by pivoting about the pivot axis and is configured in such a manner that it can be adjusted together with the backrest into at least two different backrest inclination positions. In this case, the backrest can be folded over forward about the pivot axis from each backrest inclination position independently of the lateral backrest sidewall.

11 Claims, 2 Drawing Sheets

REAR SEAT SYSTEM OF A MOTOR VEHICLE

CROSS-REFERENCE TO RELATED APPLICATION

This application claims the priority, under 35 U.S.C. § 119, of German application DE 10 2006 032 133.2, filed Jul. 12, 2006; the prior application is herewith incorporated by reference in its entirety.

BACKGROUND OF THE INVENTION

Field of the Invention

The present invention relates to a rear seat system of a motor vehicle, with at least one seat that has a backrest and a seat surface. The backrest has at least one lateral backrest sidewall extending at least over part of the height of the backrest and the backrest can be folded over forward about a pivot axis independently of the lateral backrest sidewall in order to enlarge a loading space situated behind the rear seat system.

Rear seat systems which can be completely or partially folded over have been known for a relatively long time in motor vehicles, with the wheel housings which are disposed at a relatively small distance next to or behind the rear seat system frequently causing problems when folding over the rear seat. Furthermore, the wheel housings often break up a loading area such that the latter can only be used to a limited extent, even when the rear seats are folded over.

U.S. Pat. No. 4,475,763 discloses a rear seat system of a motor vehicle, with at least one rear seat that has a backrest and a seat surface. In this case, the backrest has at lest one lateral backrest sidewall which extends at least over part of the height of the backrest and remains standing when the backrest is folded over or folded forward in order to enlarge a loading space situated behind the rear seat system.

U.S. Pat. No. 4,708,385 likewise discloses a rear seat system that has two seat backs that can be folded separately from each other. The edges of the two seat backs are provided with backrest side parts that are connected fixedly to a vehicle body via connecting elements, in particular undercut elements and screws. When the two seat backs are folded over, the backrest side parts remain fixed in position and do not follow a folding-over movement of the two seat backs.

Finally, U.S. Pat. No. 4,721,338 discloses a further rear seat system which has two seat backs which can be folded forward about a pivot axis independently of each other. In this case, lateral sidewall parts of the seat backs also remain fixed in their virtually upright position when the seat backs are folded over.

SUMMARY OF THE INVENTION

It is accordingly an object of the invention to provide a rear seat system of a motor vehicle which overcomes the above-mentioned disadvantages of the prior art and device of this general type, which is distinguished in particular by improved functionality.

With the foregoing and other objects in view there is provided, in accordance with the invention, a rear seat system of a motor vehicle. The rear seat system contains at least one seat formed of a seat surface and a backrest extending from the seat surface. The backrest has at least one lateral backrest sidewall extending at least over part of a height of the backrest and the backrest is foldable over forward about a pivot axis independently of the lateral backrest sidewall for enlarging a loading space situated behind the rear seat system. The lateral backrest sidewall is mounted to be pivotable about the pivot axis and configured such that the lateral backrest sidewall can be adjusted together with the backrest into at least two different backrest inclination positions. The backrest can be folded over forward about the pivot axis from each of the different backrest inclination positions independently of the lateral backrest sidewall.

The present invention is based on the general concept of a rear seat system of a motor vehicle, which includes at least one seat that has a backrest and a seat surface. A lateral backrest sidewall that extends at least over part of the height of the backrest is mounted such that it can be adjusted by pivoting and of configuring it in such a manner that, in order to take up different sifting positions, it can be adjusted together with the backrest into at least two different backrest inclination positions. In this case, the backrest can be folded over forward about a pivot axis from each of the backrest inclination positions taken up and independently of the lateral backrest sidewall in order to enlarge a loading space situated behind the rear seat system. This affords the particular advantage that, in the normal sitting position, the backrest sidewall or cheek can be adjusted together with the backrest into different backrest inclination positions or sitting positions and, as a result, a pleasant, in particular continuous, backrest surface is always provided. At the same time, technical components can be disposed in the backrest sidewall which cannot be folded over, the arrangement of which components would make no sense in rear seats which can be completely folded over, i.e. backrests and backrest sidewall which can be completely folded over. By this measure, the functionality of the rear seat system according to the invention can be increased, since there is no more construction space available for technical components, but at the same time the backrest sidewall is not disposed absolutely fixed in position with respect to the vehicle body and, as a result, participates in the adjustment into different backrest inclination positions, thus making pleasant sitting possible.

The lateral backrest sidewall or cheek expediently extends only over part of the height of the backrest, with a shoulder that engages over the backrest sidewall being disposed on the backrest itself. This brings about a special division of the rear seat back into its backrest part and the lateral backrest sidewall part, with the ratio between the shoulder and the lateral backrest sidewall preferably being selected in such a manner that, when the backrest is folded forward about the pivot axis, a virtually uninterrupted, i.e. continuously planar, loading area is produced. Furthermore, a shoulder of this type makes it easier to fold the backrest over forward, since an individual standing outside the vehicle has to reach less far into the vehicle in order to be able to fold over the backrest.

In an advantageous embodiment of the solution according to the invention, a construction space for a telecommunication device and/or for an airbag and/or for a storage compartment is provided in the backrest sidewall. This list already documents the diverse possibilities for arranging components, with it being important, in particular in the case of a construction space for an airbag, for the backrest sidewall to always remain in its generally upright position. By the positionally fixed configuration of the backrest sidewall or cheek with respect to the vehicle body, an electric connection between components possibly disposed in the backrest sidewall and a vehicle electric system is also significantly more simple. The small adjustment movement that can be executed by the backrest sidewall in order to take up different backrest inclination positions can easily be participated in by an electric connecting device.

Other features which are considered as characteristic for the invention are set forth in the appended claims.

Although the invention is illustrated and described herein as embodied in a rear seat system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
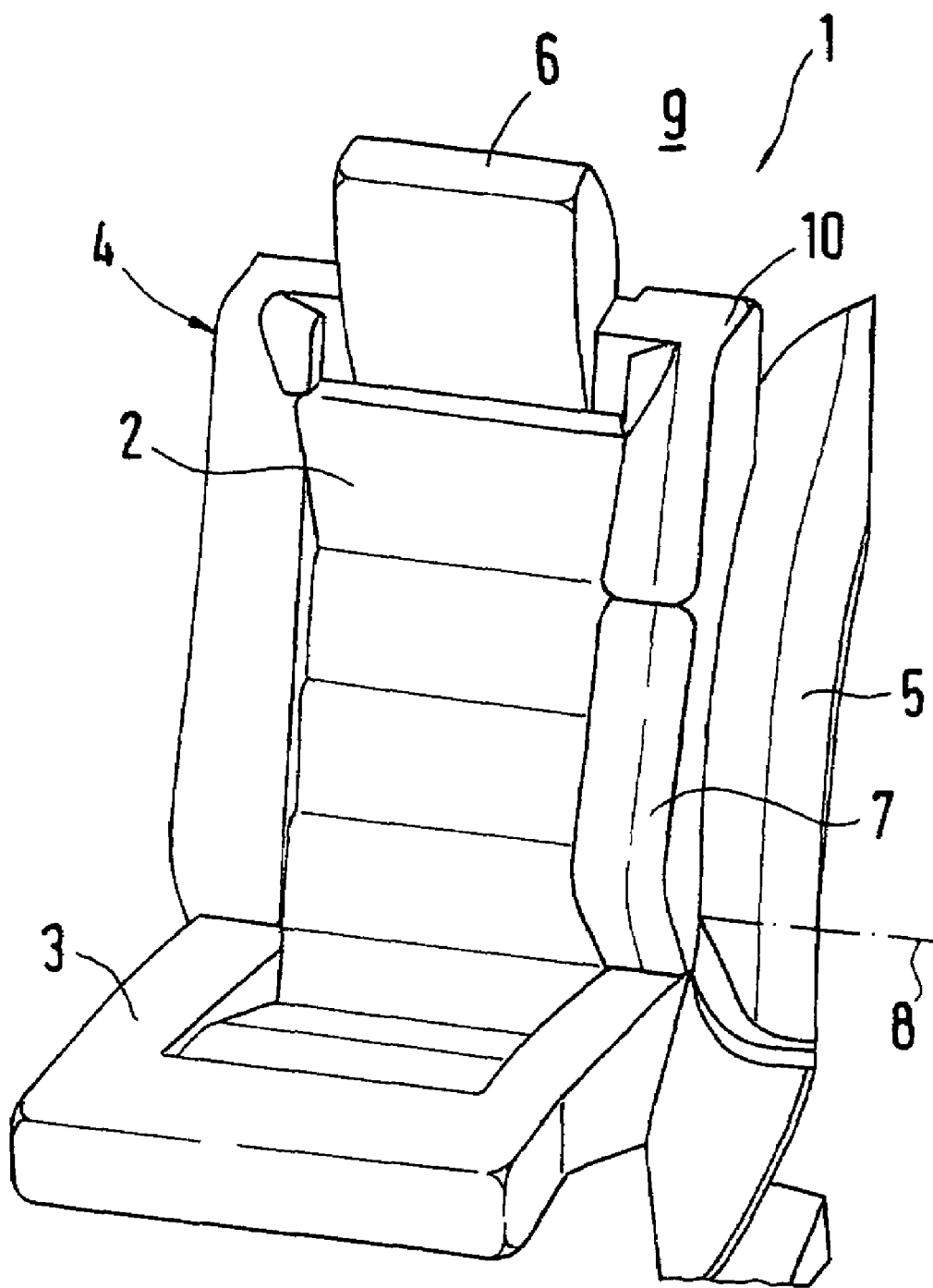
FIG. 1 is a diagrammatic, front view of a rear seat system according to the invention with a backrest in a sitting position.

Referring now to the figures of the drawing in detail and first, particularly, to FIG. 1 thereof, there is shown a rear seat system 1 according to the invention that has a rear seat 4 which has at least one backrest 2 and one seat surface 3. In this case, just one rear seat 4 of the rear seat system 1, which usually contains two rear seats, is shown, the rear seat 4 is disposed in the immediate vicinity of a wheel housing 5. Both the backrest 2 and the seat surface 3 are of a structured configuration and each have sidewall sections providing side support. Furthermore, a head restraint 6 is disposed on a top end side of the backrest 2. The sidewall section of the backrest 2 which is disposed adjacent to the wheel housing 5 has a lateral backrest sidewall or cheek 7 which extends only over part of the height of the backrest 2, with it also being conceivable for the lateral backrest sidewall 7 to be of a continuous design over an entire height of the backrest 2. In general, the backrest 2 can be folded forward about a pivot axis 8 (also see FIG. 3) independently of the lateral backrest sidewall 7 in order to be able to enlarge a loading space 9 situated behind the rear seat system 1.

According to the invention, the backrest sidewall 7 is mounted such that it can be adjusted by pivoting about the pivot axis 8 and is configured in such a manner that it can be adjusted together with the backrest 2 into at least two different backrest inclination positions. A second such backrest inclination position is illustrated by way of example in FIG. 2 by a broken line. Therefore the backrest sidewall 7 can be adjusted together with the backrest 2 into all sitting and backrest positions usually provided, and therefore pleasant sitting can be achieved. Furthermore, however, the backrest 2 can be folded over forward about the pivot axis 8 from each backrest inclination position independently of the lateral backrest sidewall 7, and therefore the backrest sidewall 7 follows an inclination of the backrest 2 only up to a certain degree but, when the backrest 2 is folded over forward about the pivot axis 8, the backrest sidewall 7 remains in its generally upright position.

In general, the division of the lateral sidewall section of the backrest 2 into the backrest sidewall 7 and a shoulder 10 which engages over the latter and is disposed above the same is illustrated only in a purely exemplary manner according to FIG. 1, and therefore also a different division between the backrest sidewall 7 and the shoulder 10 is to be covered by the invention. In particular, it is also conceivable that, as explained above, the lateral backrest sidewall 7 extends continuously over the entire height of the backrest. The shoulder 10 makes it easier for an individual standing outside the motor vehicle to fold the backrest 2 over, since the shoulder forms an engagement point disposed directly in the vicinity of the door.

Figure 2:
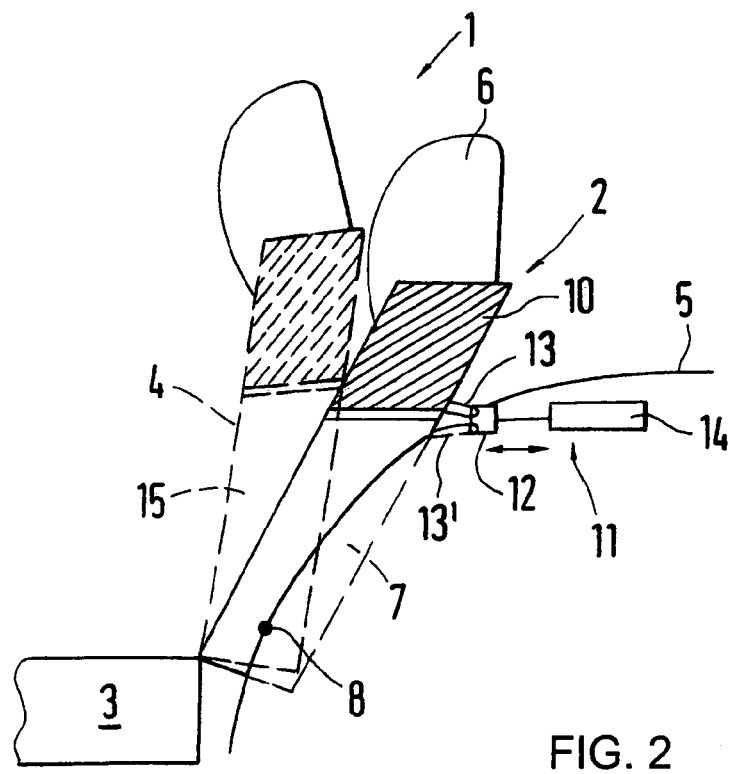
FIG. 2 is a diagrammatic, sectional view through the rear seat system in the region of a backrest sidewall or cheek.
Figure 3:
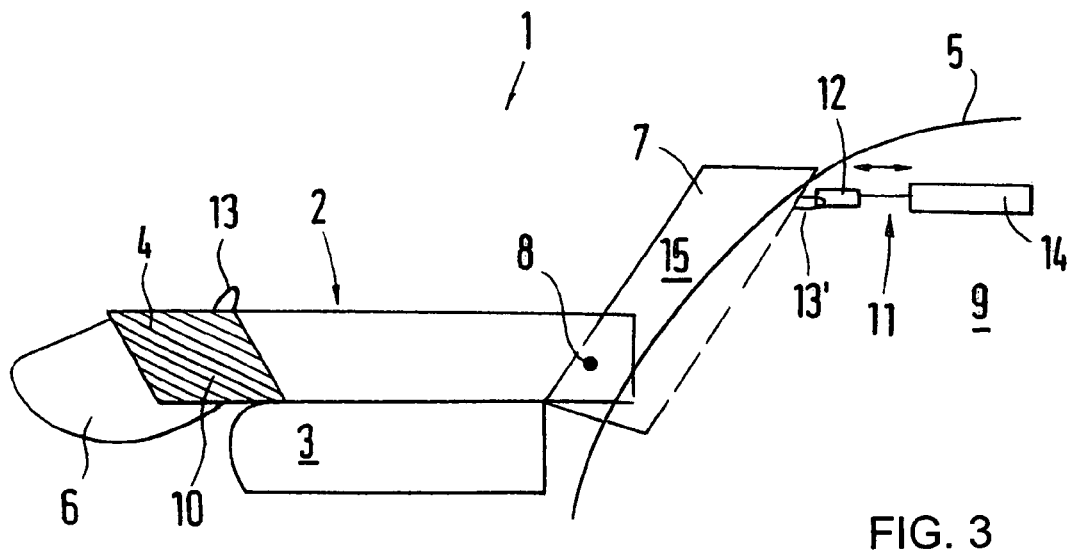
FIG. 3 is a diagrammatic, section view as in FIG. 2, but with the backrest folded over forward about the pivot axis.

According to FIGS. 2 and 3, the backrest sidewall 7 is disposed and fixed on a vehicle body, for example on the wheel housing 5 directly via a retaining device 11. In this case, it is conceivable that the backrest 2 is also fixed in the region of its shoulder 10 on the vehicle body directly via the retaining device 11, or that only the backrest sidewall 7 is fixed on the vehicle body directly via the retaining device 11 while the backrest 2 is connected, for example in the region of its shoulder 10, to the backrest sidewall or cheek 7 via a correspondingly configured and releasable connection such that the backrest 2 is fixed releasably on the vehicle body indirectly via the lateral backrest sidewall 7. The retaining device 11 can have a locking bar 12 on the vehicle body and a lock 13, 13' which can be connected thereto and is disposed on the sidewall or backrest, with it also being possible for the configuration of the locking bar 10 to be provided on the sidewall or backrest and for the configuration of the lock 13, 13' to be provided on the vehicle body. Overall, the retaining device 11 permits a generally horizontal adjustment of the locking bar 12 on the vehicle body or of the lock 13 on the vehicle body by an adjusting device 14 which is provided, as a result of which the adjustment of the backrest inclination is preferably undertaken exclusively via the adjusting device 14. The backrest sidewall 7 can be connected to the locking bar 12 of the retaining device 11 via a separate lock 13' and, as a result, participates in the adjustment of the backrest inclination. In this case, the lock 13' is preferably connected nonreleasably to the locking bar 12.

In order to fold the backrest 2 over, either the backrest 2, which is connected to the vehicle body directly via the retaining device 11, is decoupled together with the lock 13 from the locking bar 12 of the retaining device 11, or the releasable connection between the backrest sidewall 7 and the backrest 2 or the shoulder 10 thereof is released.

Irrespective of the adjustability of the backrest 2, a construction space 15 can be provided in the backrest sidewall 7, for example for a telecommunication device and/or for an airbag and/or for a storage compartment, and the backrest sidewall 7 therefore has increased functionality. In particular, the configuration of a side airbag in the construction space 15 of the backrest sidewall 7 affords the great advantage that, if a backrest sidewall 7 is not capable of being folded over, a separate disabling device for the airbag, which deactivates the airbag when the backrest sidewall 7 is folded over, does not have to be provided. Similarly, a storage compartment or a telecommunication device disposed therein is also easily accessible even when the backrest 2 is folded over forward about the pivot axis 8, since the backrest sidewall 7 never takes up a position which prevents access to the objects based in the storage compartment or to a telecommunication unit disposed in the construction space 15.

In addition, a particular advantage of the rear seat system 1 according to the invention is that the backrest 2 in its entirety, i.e. including the backrest sidewall 7, can be adjusted into various backrest inclination positions, and the backrest 2 can be folded over forward about the pivot axis 8 independently of the backrest sidewall 7, which would not be possible in the case of a backrest sidewall 7 connected fixedly to the backrest 2, since, depending on the arrangement of the pivot axis 8, when the backrest 2 is folded over a rearward pivoting of a lower part of the backrest 2 or of the backrest sidewall 7 takes place, and this is impossible on account of structural conditions, here on account of the wheel housing 5.

The invention claimed is:

1. A rear seat system of a motor vehicle, the rear seat system comprising:
   at least one seat containing:
      a seat surface; and
      a backrest extending from said seat surface, said backrest having at least one lateral backrest sidewall extending at least over part of a height of said backrest and said backrest being foldable over forward about a pivot axis independently of said lateral backrest sidewall for enlarging a loading space situated behind the rear seat system, said lateral backrest sidewall being mounted to be pivotable about the pivot axis and configured such that said lateral backrest sidewall can be adjusted together with said backrest into at least two different backrest inclination positions, said backrest can be folded over forward about the pivot axis from each of the different backrest inclination positions independently of said lateral backrest sidewall, said lateral backrest sidewall having a construction space formed therein defining a storage compartment, said lateral backrest sidewall extending only over part of said height of said backrest, and said backrest having an integrated shoulder engaging over said lateral backrest sidewall and being pivotable about the pivot axis.

2. The rear seat system according to claim 1, further comprising a retaining device for fixing said lateral backrest sidewall to a vehicle body of the motor vehicle.

3. The rear seat system according to claim 2, wherein said retaining device has a locking bar disposed on the vehicle body and a lock disposed on one of said lateral backrest sidewall and said backrest and being releasably connected to said locking bar.

4. The rear seat system according to claim 3, wherein said locking bar on the vehicle body is mounted on the vehicle body such that said locking bar can be adjusted generally horizontally with respect to an adjustment of backrest inclination.

5. The rear seat system according to claim 3, further comprising an adjusting device provided for adjusting said locking bar on the vehicle body generally horizontally with respect to an adjustment of a backrest inclination.

6. The rear seat system according to claim 2, wherein said retaining device has a lock disposed on the vehicle body and a locking bar disposed on one of said lateral backrest sidewall and said backrest and being releasably connected to said lock.

7. The rear seat system according to claim 6, wherein said lock disposed on the vehicle body is mounted on the vehicle body such that said lock can be adjusted generally horizontally with respect to an adjustment of a backrest inclination.

8. The rear seat system according to claim 6, further comprising an adjusting device provided for adjusting said lock on the vehicle body generally horizontally with respect to an adjustment of a backrest inclination.

9. The rear seat system according to claim 1, wherein said backrest is fixed releasably to a vehicle body of the motor vehicle indirectly via said lateral backrest sidewall.

10. A rear seat system of a motor vehicle, the rear seat system comprising:
    at least one seat containing:
       a seat surface; and
       a backrest extending from said seat surface, said backrest having at least one lateral backrest sidewall extending at least over part of a height of said backrest and said backrest being foldable over forward about a pivot axis independently of said lateral backrest sidewall for enlarging a loading space situated behind the rear seat system, said lateral backrest sidewall being mounted to be pivotable about the pivot axis and configured such that said lateral backrest sidewall can be adjusted together with said backrest into at least two different backrest inclination positions, said backrest can be folded over forward about the pivot axis from each of the different backrest inclination positions independently of said lateral backrest sidewall, said lateral backrest sidewall has a construction space formed therein for receiving at least one of a telecommunication device and an airbag, said backrest having an integrated shoulder engaging over said lateral backrest sidewall and being pivotable about the pivot axis; and
    a retaining device for fixing said lateral backrest sidewall to a vehicle body of the motor vehicle, said retaining device having a lock disposed on the vehicle body and a locking bar disposed on one of said lateral backrest sidewall and said backrest and being releasably connected to said lock.

11. A rear seat system of a motor vehicle, the rear seat system comprising:
    at least one seat containing:
       a seat surface; and
       a two-piece backrest extending from said seat surface, said backrest having a first piece being a lateral backrest sidewall extending over part of a height of said backrest and a second piece being a main backrest body having an integrated shoulder engaging over said lateral backrest sidewall, said main backrest body being foldable over forward about a pivot axis independently of said lateral backrest sidewall for enlarging a loading space situated behind the rear seat system, said lateral backrest sidewall being mounted to be pivotable about the pivot axis and configured such that said lateral backrest sidewall can be adjusted together with said main backrest body into at least two different backrest inclination positions, said main backrest body can be folded over forward about the pivot axis from each of the different backrest inclination positions independently of said lateral backrest sidewall, said lateral backrest sidewall having a construction space formed therein defining a storage compartment.

\* \* \* \* \*